United States Patent Office 3,496,412
Patented Feb. 17, 1970

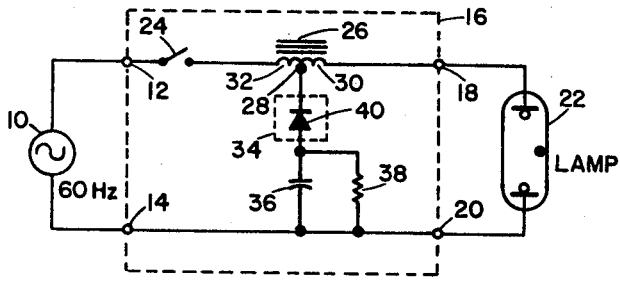
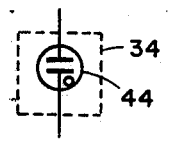
Fig.1  Fig.1A
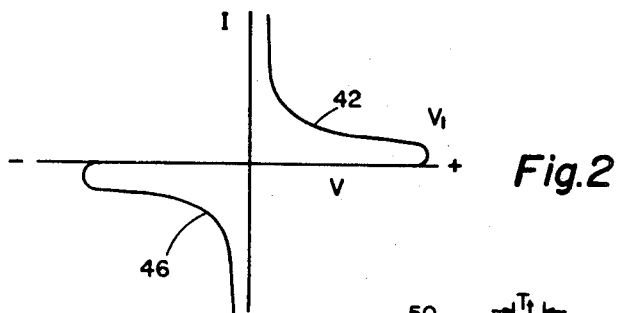
Fig.2
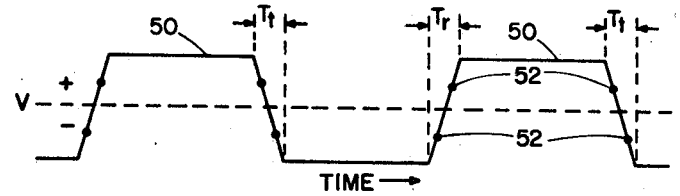
Fig.4
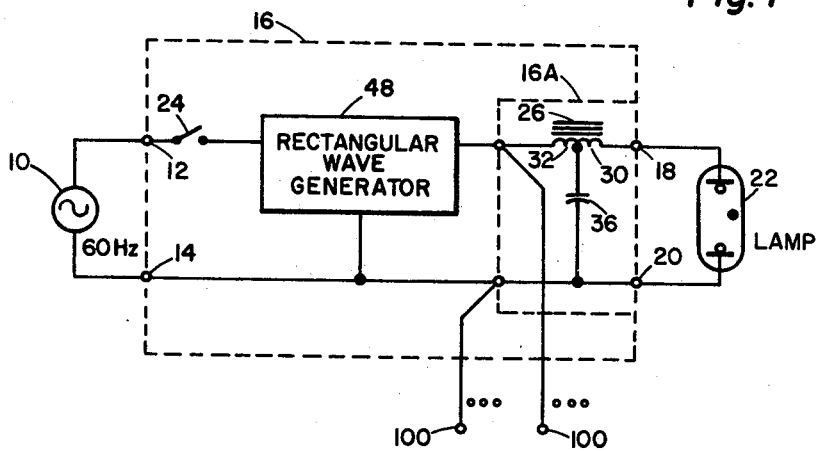
Fig.3
INVENTOR.
Douglas W. Taylor
Leo L. Lehner
BY
ATTY'S.

3,496,412
STARTING AND OPERATING CIRCUITS FOR ARC DISCHARGE TYPE LAMPS UTILIZING A RECTANGULAR WAVE GENERATOR
Douglas W. Taylor, Phoenix, and Leo L. Lehner, Scottsdale, Ariz., assignors to Motorola Inc., Franklin Park, Ill., a corporation of Illinois
Filed Nov. 4, 1966, Ser. No. 592,105
Int. Cl. H05b 31/00, 31/30, 33/00
U.S. Cl. 315—244                     5 Claims

ABSTRACT OF THE DISCLOSURE

A rectangular wave generator is electrically interposed between a source of alternating current power and a plurality of arc discharge lamps each having a ballast with a capacitor connected between a tap point on the ballast and the rectangular wave generator. The rectangular wave generator is operative to provide an output square or rectangular wave which has a transition period between opposing polarities of voltage less than the deionization time of the arc discharge lamps such that the lamps never extinguish so long as the rectangular wave generator is actuated

---

This invention relates generally to starting and operating circuits for the arc discharge type of lamps, and more particularly to those circuits which may automatically restart an arc discharge lamp when it deionizes.

It is known to use resonant LC circuits in series with a source of current to ignite arc discharge lamps. When the resonant circuit is energized, the arc discharge lamp is ignited and can draw a high current amplitude. To limit current amplitude, an inductive ballast is connected in series circuit with the arc discharge lamp. In instances of prior art, the ballast has been separate from the starting and operating circuit.

It is also known to use pulsing techniques for inducing a stepped up voltage in an autotransformer for providing an initial voltage for igniting an arc discharge lamp prior to the time the AC supply voltage during a given cycle has built up to such ignition amplitude. In such circuits, a separate autotransformer and ballast have often been provided. This combination adds cost and complexity to such circuits.

In operating arc discharge lamps it is desired to have a desired inductance in the series circuit to ensure current limiting while permitting rapid ignition of the arc discharge lamp as may be caused by a voltage amplitude build-up of an AC electrical power source.

Accordingly, it is an object of this invention to provide a starting and operating circuit for an arc discharge type of lamp which utilizes a combined ballast and starting circuit inductive element.

It is a further object of this invention to provide a starting and operating circuit for an arc discharge lamp which has a minimum number of electrical components.

It is still another object of this invention to provide an arc discharge lamp starting and operating circuit which utilizes rectangular waves.

It is another object of this invention to provide an arc discharge lamp starting and operating circuits which operate at low frequency and yet provide for a continuous ionization of an arc discharge lamp.

A feature of this invention includes a tapped ballast in the series electrical circuit with an arc discharge lamp and a starting circuit being connected between the tap and one end of the arc discharge lamp. Circuit means are provided for introducing electrical transients into the ballast and a capacitor for providing an increased voltage for igniting the arc discharge lamp. In another form means are provided for supplying a rectangular wave to such starting and operating circuit which has such a rapid transition between first and second electrical states that the discharge lamp will not deionize and therefore operates without flicker.

Referring now to accompanying drawings wherein:

FIG. 1 is a schematic diagram of an embodiment of the present invention;

FIG. 1A is a schematic diagram showing another avalanche type electrical unit usable with the FIG. 1 embodiment;

FIG. 2 is a graph illustrating avalanche breakdown characteristics of a unit for causing electrical transients in the FIG. 1 embodiment;

FIG. 3 is a schematic diagram of a second embodiment of subject invention utilizing a rectangular wave generator for introducing transients into the starting and operating circuits;

FIG. 4 is a graph showing idealized rectangular waves usable with the FIG. 3 embodiment.

According to this invention a 60-cycle AC supply, for example, may be connected across a pair of input terminals of a starting and operating circuit operating an arc discharge lamp. An inductance ballast is connected between one of the input and output terminals forming one side of the AC circuit. The ballast has a center tap to which is connected an electrical unit having avalanche breakover voltage characteristics. A capacitor is connected between the unit and the other input and output terminals which normally are the ground side of the electrical circuit. As the supply voltage builds up during a given cycle, the voltage is impressed across the electrical unit until breakover occurs. At this point there is avalanche breakdown and a current surge flows through a portion of the ballast closest to the input for inducing a voltage in the ballast in an autotransformer manner. This action supplies an increased ignition voltage to the lamp. Subsequent to ignition, the lamp presents a low impedance effectively taking the capacitor and electrical unit out of the circuit and the ballast operates in its normal manner, as for a fluorescent lamp circuit.

According to a second embodiment of the present invention a 60-cycle source is connected to a rectangular wave generator. The output power of this rectangular wave generator is supplied across a center tapped ballast inductance element and a capacitor connected to the center tap. A pair of output terminals are provided between one end of the inductive ballast and said capacitor. As the rectangular wave generator supplies its wave to the circuit, current conduction direction is recurrently reversed causing rapid transients to repeatedly supply stepped-up voltages across the lamp, such as referred to with respect to the first described embodiment. It is preferred that the rise and fall times of the rectangular waves be relatively short with respect to the period of the waves. It is also preferred that the transition times between the positive and negative polarity extinguishing potentials of the lamp be shorter than the deionization time of the lamp to provide continuous luminescence from the arc discharging lamp.

Referring now more particularly to FIG. 1 there is shown a first embodiment of the invention wherein 60-cycle AC source 10 is connected to a pair of input terminals 12 and 14 of the arc discharge lamp starting and operating circuit 16. Circuit 16 has a pair of output terminals 18 and 20 which are connected to arc discharge lamp 22, for example, a fluorescent lamp. Switch 24 may be provided within the circuit 16 for turning lamp 22 on. A single ballast 26 is connected between switch 24 and output terminal 18 to provide the usual and well known ballast function for an arc discharge lamp. However, ballast 26 is tapped as at 28, with the inductance of portion 30 being related to the inductance of portion 32 in a manner related to the desired voltage build up across terminals 18 and 20. An increased ignition voltage is caused by the autotransformer action between portions 30 and 32 of ballast 26. Tap 28 is connected to an avalanche breakover type of electrical unit 34 (later described in detail) which in turn is series connected with capacitor 36 which has its other end connected to terminals 20 and 14. A resistor 38 may be added across capacitor 36. As shown, unit 34 consists of an avalanche semiconductor diode 40 which may be of a PNPN type. Such a diode is also referred to as a multilayer semiconductor device.

When switch 24 is closed, the circuit receives the AC power from source 10 which builds up a voltage amplitude during each cycle through portion 32 of ballast 26 and capacitor 36 across electrical unit 34. When unit 34 breakover voltage is reached, unit 34 suddenly becomes an extremely low impedance permitting current flow from source 10 through portion 32 and thence capacitor 36. This current flow induces a voltage in portion 32 which is transferred to portion 30 by autotransformer action, as is well known. The auto-transformed voltage is added to source 10 voltage for supplying an increased voltage across terminals 18 and 20 to ignite lamp 22.

Electrical unit 34 may consist of any electrical device which has the breakover voltage characteristics referred to as avalanche breakdown voltage characteristics such as illustrated in FIG. 2.

Referring to FIG. 2 diode 40 of FIG. 1 passes insubstantial current as the voltage V is increased in a positive direction until the breakover voltage $V_1$ is reached, at which time the electrical impedance of diode 40 rapidly decreases as illustrative by curve 42. The resulting rapid increase in current amplitude and reduced voltage drop of unit 34 causes an electrical transient in portion 32 of ballast 26 for igniting lamp 22.

Referring now to FIG. 1A there is illustrated in schematic form a neon type of discharge lamp 44 which is shown as forming electrical unit 34 (FIG. 1). Lamp 44 has characteristics shown in FIG. 2 including the avalanche breakdown voltage curve 42 and avalanch breakdown voltage curve 46. That is, it has a bilateral or bidirectional breakover voltage characteristic. Therefore, it produces an electrical transient, i.e., avalanche breakdown, for each half cycle of the alternating current provided by source 10 of FIG. 1.

Referring now to FIG. 3 there is shown a second embodiment of the subject invention wherein like numerals denote like parts and structural features. AC source 10 provides alternating current power to a pair of input terminals 12 and 14. Manual switch 24 may be inserted in series with input terminal 12 inside the starting and operating circuit 16. Circuit 16 has a pair of output terminals 18 and 20 which are connected across fluorescent lamp 22. An inductive ballast 26 has one end connected to terminal 18 and the other end connected to rectangular wave generator 48. Wave generator 48 may take any form. The particular configuration for generating rectangular waves from the alternating current source 10 is not important to the present invention. Rectangular wave generator 48 is connected to input terminal 14 and through switch 24 to the input terminal 12. Each successive transition of the rectangular wave from generator 48 provides a transient voltage across portion 32 of ballast 26 and capacitor 36. This transient is autotransformed through portion 30 of ballast 26 to produce an increased ignition voltage across the terminals 18 and 20. After the rectangular wave has reached its maximum amplitude in either polarity, ballast 26 operates in its normal manner to limit the current amplitude through lamp 22.

Referring now to FIG. 4 a rectangular wave produced by generator 48 is shown in idealized form. Wave 50 has a rise time $T_r$ which is preferably less than 10 percent of the period of the wave. It is desired that the trailing edge $T_t$ takes as long as the rising wave front. Since the transitions in the rectangular wave 50 are sudden, the transitions introduce high frequency components into the starting circuit 16 which are independent of the periodicity of the wave. Therefore, the basic or fundamental frequency of wave 50 may be 60-cycles and the circuit can repetitively ignite lamp 22 each half cycle of the AC current provided by source 10.

It is preferred that the wave 50 be such that lamp 22 never deionizes. This action is accomplished by limiting the rise and fall times of wave 50 between the deionization voltage amplitude points, collectively designated 52, to be less than the deionization time of lamp 22. In this manner lamp 22 never extinguishes. The operation of lamp 22 under such conditions is such that the arc forming particles inside the lamp are kept suspended and ionized during the transition period; then when the polarity of the wave is reversed the direction of the arc will also be reversed without deionization. This latter method of operation provides a substantially constant amplitude light output.

The provision of a rectangular wave generator 48 for one fluorescent lamp may not provide economic advantages. However, for a large plurality of lamps 22 there may be provided one rectangular wave generator 48 connected to a plurality of starting circuit portions 16A; one portion 16A for each lamp 22 with the portions 16A being connected in parallel to generator 48, terminals 100 with ellipsis indicating such additional portions 16A.

What is claimed is:
1. A starting and operating circuit for arc discharge type lamps, including the combination,
    first and second input terminals and first and second output terminals with said second terminals being connected directly together,
    a unitary ballast including an inductor portion having a tap and connected between said first input and output terminals,
    a capacitor connected between said tap and said second output terminals,
    a rectangular wave generator connected across said input terminals and responsive to receiving an alternating current voltage across said input terminals to generate a rectangular wave having successive rapid transitions between opposite polarity signal states, said ballast and capacitor being connected to said rectangular wave generator for receiving said rectangular wave and being responsive to said rapid transitions in said rectangular wave to periodically supply each half cycle an arc discharge initiating pulse.

2. The combination as in claim 1 wherein said rectangular wave generator provides rectangular waves having transitions of shorter duration than a deionization time of an arc discharge lamp to be connected to said output terminals.

3. The combination as in claim 1 further including an additional unitary ballast having a tap and connected to a second set of output terminals, one end of said ballast being connected to a first one of said second set output terminals,
    a capacitor connected between said tap of said second ballast and a second one of said second set output terminals and another end of said ballast being connected to said rectangular wave generator,
    and said capacitor connected to said second terminal such that one rectangular wave generator provides starting pulses to a plurality of arc discharge lamps respectively connected through unitary ballasts having a tap with a capacitor connected between the tap and one end of the respective arc discharge lamps.

4. An arc discharge lamp system, including in combination,
    a rectangular wave generator for generating a rectangular wave having successive rapid transitions between opposite polarity states in response to an alternating current signal supplied thereto,
a plurality of unitary ballasts each connected to said generator,
a plurality of capacitors respectively connected to said ballasts, and a plurality of pairs of output connections for being connected respectively to arc discharge lamps and being across said ballasts and said capacitors, respectively, said ballast and capacitor being responsive to said rapid transitions in said rectangular wave to periodically supply arc discharge initiating pulses to the lamps.

5. The system of claim 4 wherein said ballasts are each tapped and each having one end connected to said generator each having another end forming one of said output connections, and said capacitors respectively connected to said taps and to another of said output connections.

References Cited

UNITED STATES PATENTS

| | | | |
|---|---|---|---|
| 3,364,386 | 1/1968 | Segawa et al. | 315—103 |
| 3,219,880 | 11/1965 | Pett | 315—240 |
| 3,235,769 | 2/1966 | Wattenbach | 315—176 |

JOHN W. HUCKERT, Primary Examiner

B. ESTRIN, Assistant Examiner

U.S. Cl. X.R.

315—257, 232, 282, 287; 328—55, 56